(12) United States Patent
Ghiaus et al.

(10) Patent No.: US 11,200,365 B2
(45) Date of Patent: *Dec. 14, 2021

(54) SYSTEMS AND METHODS FOR PRODUCT VISUALIZATION USING A SINGLE-PAGE APPLICATION

(71) Applicant: Leap Tools Inc., Toronto (CA)

(72) Inventors: Stefan-Alexandru Ghiaus, Toronto (CA); Vlad Cristian Susanu, Toronto (CA)

(73) Assignee: Leap Tools Inc., Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/947,817

(22) Filed: Aug. 19, 2020

(65) Prior Publication Data
US 2021/0240908 A1    Aug. 5, 2021

Related U.S. Application Data

(63) Continuation of application No. 16/777,697, filed on Jan. 30, 2020, now Pat. No. 10,817,648.

(51) Int. Cl.
*G06F 40/103* (2020.01)
*G06Q 30/06* (2012.01)
(Continued)

(52) U.S. Cl.
CPC ............ *G06F 40/103* (2020.01); *G06F 9/44* (2013.01); *G06F 16/9538* (2019.01);
(Continued)

(58) Field of Classification Search
None
See application file for complete search history.

(56) References Cited

U.S. PATENT DOCUMENTS

| 10,554,616 | B1 | 2/2020 | Teodosiu et al. | |
| 2008/0294978 | A1* | 11/2008 | Klintsov | G06F 16/38 715/234 |

(Continued)

OTHER PUBLICATIONS

Higgins, "How would that couch look at Home? Check Your Phone", The New York Times, Oct. 3, 2017, Retrieved from the Internet: URL:https://www.nytimes.com/2017/10/03/style/apps-for-decorating-rooms.html [retrieved on Jun. 14, 2021] (4 pgs.).

(Continued)

*Primary Examiner* — Steven Z Elbinger
(74) *Attorney, Agent, or Firm* — Finnegan, Henderson, Farabow, Garrett & Dunner, LLP

(57) ABSTRACT

Systems and methods are disclosed for visualizing products in a single-page application. Consistent with disclosed embodiments, an application system can receive from a client system, during rendering of a webpage received by the client system from a host system, a request for a script associated with the host system. The script can be executable by the client system to perform operations including modifying the webpage to include a visualization application in response to a selection of a visualization control in the webpage by a user of the client system. Consistent with disclosed embodiments, the application system can receive, from the visualization application, a request to display a product in a first image. A location can be identified in the first image using a machine learning model. Instructions can be provided to the visualization application for displaying the product at the location.

20 Claims, 16 Drawing Sheets

(51) Int. Cl.

| | | |
|---|---|---|
| *G06N 20/00* | (2019.01) | |
| *G06F 16/9538* | (2019.01) | |
| *G06F 9/44* | (2018.01) | |
| *G06T 5/50* | (2006.01) | |
| *G06T 19/20* | (2011.01) | |
| *G06K 9/62* | (2006.01) | |
| *G06T 5/00* | (2006.01) | |

(52) U.S. Cl.
CPC ............ *G06K 9/628* (2013.01); *G06N 20/00* (2019.01); *G06Q 30/0625* (2013.01); *G06Q 30/0643* (2013.01); *G06T 5/005* (2013.01); *G06T 5/50* (2013.01); *G06T 19/20* (2013.01); *G06T 2200/24* (2013.01); *G06T 2207/20084* (2013.01); *G06T 2219/2004* (2013.01); *G06T 2219/2016* (2013.01)

(56) References Cited

U.S. PATENT DOCUMENTS

| | | |
|---|---|---|
| 2010/0017696 A1 | 1/2010 | Choudhary et al. |
| 2012/0231424 A1 | 9/2012 | Calman et al. |
| 2016/0070682 A1 | 3/2016 | Furtwangler et al. |
| 2016/0163109 A1 | 6/2016 | Kobayashi |
| 2018/0025404 A1 | 1/2018 | Harris et al. |
| 2018/0122114 A1 | 5/2018 | Luan et al. |
| 2018/0158124 A1 | 6/2018 | Caruso et al. |
| 2018/0315248 A1 | 11/2018 | Bastov et al. |
| 2019/0050427 A1 | 2/2019 | Wiesel et al. |
| 2019/0236844 A1 | 8/2019 | Balasian et al. |
| 2019/0310757 A1 | 10/2019 | Lee et al. |
| 2019/0325498 A1 | 10/2019 | Clark |
| 2019/0378204 A1 | 12/2019 | Kumar et al. |
| 2019/0378341 A1 | 12/2019 | Xie et al. |
| 2020/0066050 A1 | 2/2020 | Ha et al. |
| 2020/0074182 A1 | 3/2020 | Chang et al. |
| 2020/0074534 A1 | 3/2020 | Mebed et al. |
| 2020/0117336 A1* | 4/2020 | Mani ................... G06F 16/904 |
| 2020/0201515 A1 | 6/2020 | Moon et al. |
| 2020/0312013 A1 | 10/2020 | Dougherty et al. |
| 2020/0357188 A1 | 11/2020 | Kurabayashi |

OTHER PUBLICATIONS

Holdefehr, "These Innovative Apps Help You Visualize Furniture in Your Home Before You Buy It", realsimple.com, Jul. 12, 2019, Retrieved from the Internet: URL:https://www.realsimple.com/home-organizing/decorating/augmented-reality-furniture-shopping-apps [retrieved on Jun. 14, 2021] (3 pgs.).

Anonymous: "Single-page application", Wikipedia, the free encyclopedia, Oct. 17, 2015, Retrieved from the Internet: URL:http://web.archive.org/web/20151017230843/https://en.wikipedia.org/wiki/Single-page application [retrieved on Dec. 1, 2016] (6pgs.).

Extended European Search Report dated Jun. 24, 2021, received in EP21154648 (11 pgs.).

International Search Report and Written Opinion of the International Search Authority received in international application No. PCT/IB2021/000039, dated Jul. 8, 2021 (8 pgs.).

* cited by examiner

SYSTEMS AND METHODS FOR PRODUCT VISUALIZATION USING A SINGLE-PAGE APPLICATION

CROSS-REFERENCE TO RELATED APPLICATIONS

This application is a continuation of U.S. patent application Ser. No. 16/777,697, entitled "SYSTEMS AND METHODS FOR PRODUCT VISUALIZATION USING A SINGLE-PAGE APPLICATION," filed Jan. 30, 2020 (now issued as U.S. Pat. No. 10,817,648), the entirety of which is incorporated herein by reference.

BACKGROUND

A webpage may display an image of a product. But a user of the webpage may wish to see how the product would appear in a particular location, such as her home. Adding such visualization functionality to the webpage may be a difficult task. Relying on an external visualization application (e.g., by providing a parameterized link in the webpage to the external visualization application) may be problematic for both the user and the operator of the website. When using such a parameterized link, bots and crawlers may be able to access the external visualization application through the link, corrupting usage data of interest to the website operator. Furthermore, the operator must design the website to correctly handle communication with the external visualization application. Incorrect communication can result in errors affecting the user experience, such as visualizations of incorrect products or incorrectly localized interfaces. In addition, the operator may not be able to track user interactions with the external visualization application, such as what users viewed, how often they viewed it, and how long they viewed it for. Such information may be of considerable importance to the operator of the website.

SUMMARY

The disclosed systems and methods can enable a webpage to provide interactive visualization of products in images selected or provided by users. In some embodiments, the webpage can provide (or be modified to provide) single-page application functionality, allowing the user to select products for which visualizations are available and interact with the visualizations in the selected or provided images, without refreshing the webpage, opening a new webpage, or navigating away from the webpage.

The disclosed embodiments include a method for visualizing products in a single-page application. The method can include receiving a request for a script associated with a host system. The request can be received by an application system from a client system during rendering of a webpage received by the client system from the host system. The script can be executable by the client system 110 to perform operations. The operations can include modifying the webpage to include a visualization application in response to a selection of a visualization control in the webpage by a user of the client system. The method can further include receiving, by the application system from the visualization application, a request to display a product in a first image. The method can further include identifying a location in the first image using a machine learning model. The method can further include providing instructions to the visualization application for displaying the product at the location.

The disclosed embodiments include a system for visualizing products in a single-page application. The system can include at least one processor and at least one memory containing first instructions. When executed by the at least one processor, the first instructions can cause the system to perform operations. The operations can include receiving a webpage from a host system. The operations can further include modifying the webpage to include a visualization application in response to a selection of a visualization control in the webpage by a user of the system. The operations can also include providing, to an application system in response to user interactions with the visualization application, a request to display a product in a first image. The operations can additionally include receiving, from the application system, second instructions for displaying the product.

It is to be understood that both the foregoing general description and the following detailed description are exemplary and explanatory only and are not restrictive of the disclosed embodiments or the scope of the inventions as claimed. The concepts in this application may be employed in other embodiments without departing from the scope of the inventions.

BRIEF DESCRIPTION OF THE DRAWINGS

The drawings are not necessarily to scale or exhaustive. Instead, emphasis is generally placed upon illustrating the principles of the inventions described herein. The accompanying drawings, which are incorporated in and constitute a part of this specification, illustrate several embodiments consistent with the disclosure and together with the description, serve to explain the principles of the disclosure. In the drawings.

DETAILED DESCRIPTION

Figure 1:
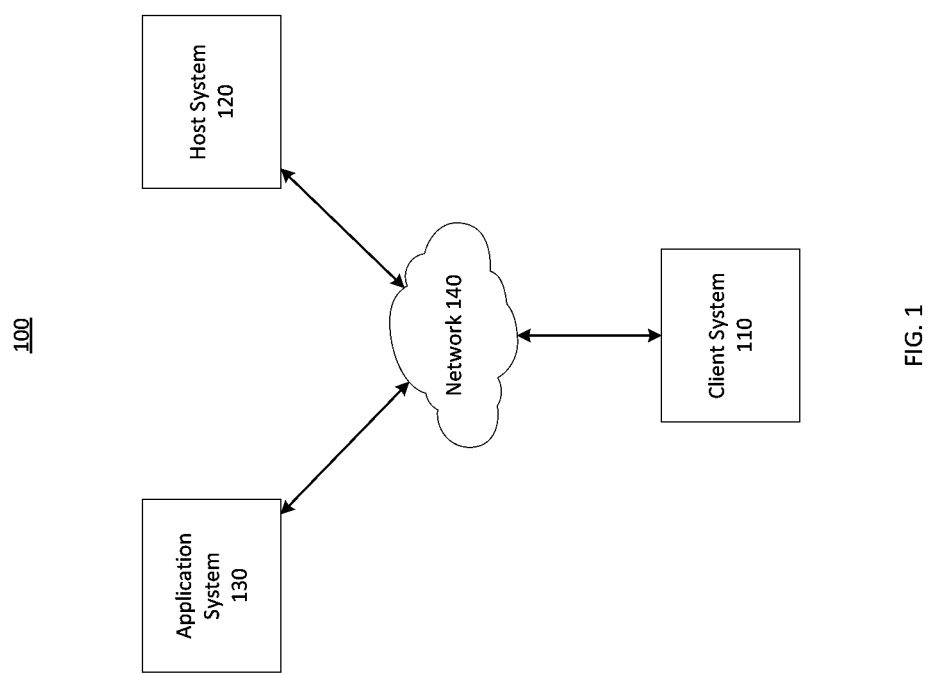
FIG. 1 depicts an exemplary system for providing interactive visualizations using a single-page application, in accordance with disclosed embodiments.

Reference will now be made in detail to exemplary embodiments, discussed with regards to the accompanying drawings. In some instances, the same reference numbers will be used throughout the drawings and the following description to refer to the same or like parts. Unless otherwise defined, technical or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. Thus, the materials, methods, and examples are illustrative only and are not intended to be necessarily limiting.

The disclosed embodiments can enable a webpage to provide interactive visualization of products in images selected or provided by users. The products can include physical goods. For example, the products can include furniture (e.g., a table, chair, or the like), decorative objects or decorations (e.g., a vase, picture, or the like), functional objects (e.g., a lamp, consumer electronic device, or the like), construction or finishing materials (e.g., flooring, paneling or molding, a countertop material, paint, wallpaper, or the like), or like physical goods. The interactive visualizations can benefit users by affording them the opportunity to view a product in a particular location before obtaining the product. The disclosed embodiments can be structured as single-page applications, with the webpage modified as-needed to support interactive visualization, without reloading the webpage or navigating to a new webpage. Such a single-page application framework can improve the user experience, as reloading the webpage or navigating to a new webpage can disrupt the user experience.

A visualization application can be integrated into the webpage to provide the interactive visualizations. Integration of the visualization application into the webpage can be handled using a script, which can be customized for the webpage. The script can configure the web browser displaying the webpage to perform a variety of useful functions. Such functions can include determining whether the browser can support the visualization application; determining whether products described or referenced in the product page are available for visualization; determining an appropriate language for providing the visualization; filtering out bots and crawlers that might otherwise pollute usage statistics; placing first-party cookies that can be used to track user sessions, as well as conversions (e.g., purchases or the like); and integrating the visualization application with an ordering application, so that users can initiate orders from within the visualization application. The script can be embedded into the webpage using a tag. Thus the functionality provided by the disclosed embodiments can be added to a webpage without requiring extensive modifications to the webpage.

FIG. 1 depicts an exemplary system 100 for providing interactive visualizations using a single-page application, in accordance with the disclosed embodiments. As depicted in FIG. 1, system 100 can include client system 110, host system 120, and application system 130. Client system 110, host system 120, and application system 130 can be configured to communicate using network 140. Client system 110 can be configured to retrieve the webpage from host system 120 and retrieve the script and visualization application from application system 130. The script can be used to integrate the webpage and the visualization application, removing from the developer of the webpage the burden of integrating the webpage and visualization application. The visualization application can allow the user to modify an image to display products depicted or referenced in the webpage.

Client system 110 can be configured, according to a script, to display a webpage including a visualization of a product in an image. Client system 110 can be or include an interactive computing device with a display. For example client system 110 can be or include a desktop, a laptop, smart phone, a tablet, or a wearable device. Client system 110 can be configured to obtain the webpage from host system 120. For example, client system 110 can be configured with a web browser and a user of client system 110 can interact with the web browser (e.g., by entering a URL into an address bar or selecting a reference to the webpage in another webpage, or the like) to cause client system 110 to request a webpage from host system 120. Client system 110 can use the webpage to implement a single-page application, in which the webpage is repeatedly modified (e.g., in response to user interactions or data or instructions received from host system 120 or application system 130). The webpage can include instructions that, when processed by client system 110, cause client system 110 to obtain a script from application system 130. Client system 110 can be configured to execute the script.

Client system 110 can be configured, according to the script, to determine whether the webpage can be modified to display an image modified to depict a product. In some embodiments, client system 110 can determine the products displayed or referenced in the webpage. In various embodiments, client system 110 can determine whether application system 130 can obtain visualization information enabling modification of an image to display a product depicted or referenced in the webpage. When such visualization information is available, client system 110 can be configured to modify the webpage to display a control.

Client system 110 can be configured, according to the script and in response to selection of the control, to modify the webpage to display a visualization application. Client system 110 can use the visualization application, in accordance with the script, to display the modified image. The visualization application can enable a user of client system 110 to select the image (e.g., by uploading the image or selecting a saved or predetermined image). Client system 110 can transmit a request to display the modified image to application system 130. Client system 110 can receive instructions for displaying the product in the image from application system 130. In some embodiments, the instructions can include a version of the image, modified to display the product in the image. In various embodiments, the instructions can include a model of the product and instructions or data enabling the visualization application to display the model of the product in the image. For example, the instructions and data can specify at least one of a scaling, perspective, or lighting of the product in the image. Client system 110 can then display the image in accordance with the instructions received from application system 130. For example, when the instructions include a model of the product and information describing the scale and perspective of the object at a location in the image, client system 110 can be configured to place an image of the product, based on the model, scale, and perspective information, at the location in the image. In some embodiments, client system 110 can be configured to subsequently update the image based on user interaction. For example, a user can interact with the visualization application to change the position or orientation of the product within the image. The client can then recalculate how the model of the product is displayed, based on the changed position or orientation information and the instructions previously received from application system 130.

In some embodiments, the script can be configured to manage interactions or control communications between the visualization application and the webpage. For example, the visualization application can create events in response to user interactions. These events can be handled by the script. For example, the user can interact with the visualization application to indicate an intention to purchase a product. In response, the visualization application can generate an event, which can be handled by the script. The script can configure client system 110, in response to the event, to initiate a purchase or add the product to a shopping cart through the webpage. Similarly the script can configure client system 110 to set cookies in response to events generated by the visualization application. These cookies can then be read by host system 120.

Host system 120 can be configured to provide the webpage to client system 110. Host system 120 can be or include a computing system, such as a desktop, workstation, server, server cluster, cloud computing environment (e.g., Amazon Web Services™ (AWS), Microsoft Azure™, IBM Cloud™, Google Cloud Platform™, Cisco Metapod™, Joyent™, vmWare™, or the like), or other suitable computing system. Host system 120 can be configured as a web server. For example, host system 120 can provide one or more webpages to web browsers in response to requests (e.g., HTTP requests or the like). The webpages can be configured to provide single-page application functionality. For example, the webpage can include data and instructions enabling a web browser of a client to modify the webpage without reloading a new webpage from host system 120. In some embodiments, host system 120 can be associated with a provider of the products displayed or referenced by the webpage. For example, the host system can provide a catalog of the products available for purchase from the provider (e.g., host system 120 can provide webpages for a consumer goods store such as Home Depot, Walmart, or the like).

Application system 130 can be configured to enable client system 110 to modify an image to include a product. Application system 130 can be or include a computing system, such as a desktop, workstation, server, server cluster, cloud computing environment (e.g., Amazon Web Services™ (AWS), Microsoft Azure™, IBM Cloud™, Google Cloud Platform™, Cisco Metapod™, Joyent™, vmWare™, or the like), or other suitable computing system.

Application system 130 can be configured to provide a script to client system 110. Application system 130 can provide the script in response to a request transmitted by client system 110. As shown in the following example, the webpage can include an element that causes client system 110 to request the script from application system 130:

<script type="text/javascript" src="https://host address/scriptname" async></script>

In this example, the script tag can be included within the webpage (e.g., within a <head> tag or <body> of the webpage). The host address can be a URL pointing to a location hosted by application system 130 (e.g., a directory), while scriptname can be a name of the script stored by application system 130 at that location. In this example, the scriptname can be or include a codename associated with host system 120 or a product provider associated with host system 120. In this example, the location hosted by application system 130 can include multiple differing scripts having different script names. When client system 110 processes the webpage, the script tag can cause client system 110 to request the script scriptname located at host address from application system 130. Client system 110 can then execute the script to provide functionality as described herein.

Application system 130 can be configured to communicate with client system 110 after provision of the script. In some embodiments, application system 130 can receive, from client system 110, an indication of one or more products displayed or referenced by the webpage. Application system 130 can determine whether information enabling display of each of the one or more products is available. When such information is available for a product, application system 130 can provide an indication of such availability to client system 110.

In various embodiments, application system 130 can be configured to generate instructions regarding the display of a modified image including the product. These instructions can be generated in response to a request to display the modified image including the product. The request can include the image in which the product is to be displayed or a selection of an image (e.g., a previously stored or predetermined image). When an image is received (e.g., an image uploaded by the user), application system 130 can be configured to process the image to determine image characteristics such as a perspective of the image, to identify surfaces in the image (e.g., floors, walls, countertops, tables, or the like), to determine distances to surfaces in the image, or to obtain similar information. As described herein, such processing can be performed using a machine learning model (e.g. neural network model, or the like). When a previously stored or predetermined image is selected, application system 130 can be configured to obtain the image (e.g., receive the image from another system, retrieve the image from a database, computer memory, or the like, accessible to application system 130, or the like).

In some embodiments, application system 130 can be configured to provide, to client system 110, the generated instructions. In some embodiments, the instructions can include the image, or a modified version of the image. For example, the instructions can include the image modified to display the product. Additionally or alternatively, the instructions can include a model of the product (e.g., a three-dimensional model, or the like). When client system 110 does not have the image, for example when the request includes a selection of a stored or predetermined image, application system 130 can be configured to provide the image, in addition to the model of the product.

In some embodiments, application system 130 can be configured to provide, to client system 110, updated instructions in response to user interactions with the product. For example, a user can interact with client system 110 to request repositioning or reorientation of the product in the image. Client system 110 can be configured to provide the request to application system 130, which can generate instructions to reposition or reorient the product in the image. For example, the instructions can include an updated version of the image with the product repositioned or reoriented in accordance with the request provided by client system 110.

Network 140 can facilitate communication and sharing of information between client system 110, host system 120, and application system 130. Network 140 may be any type of network that provides communications, exchanges information, and/or facilitates the exchange of information. For example, network 140 may be the Internet, a Local Area Network, a cellular network, a public switched telephone network ("PSTN"), or other suitable connection(s) that enables transmission of information between the components of system 100. Network 140 may support a variety of electronic messaging formats and may further support a variety of services and applications for communicating between client system 110 and host system 120, or client system 110 and application system 130.

Figure 2:
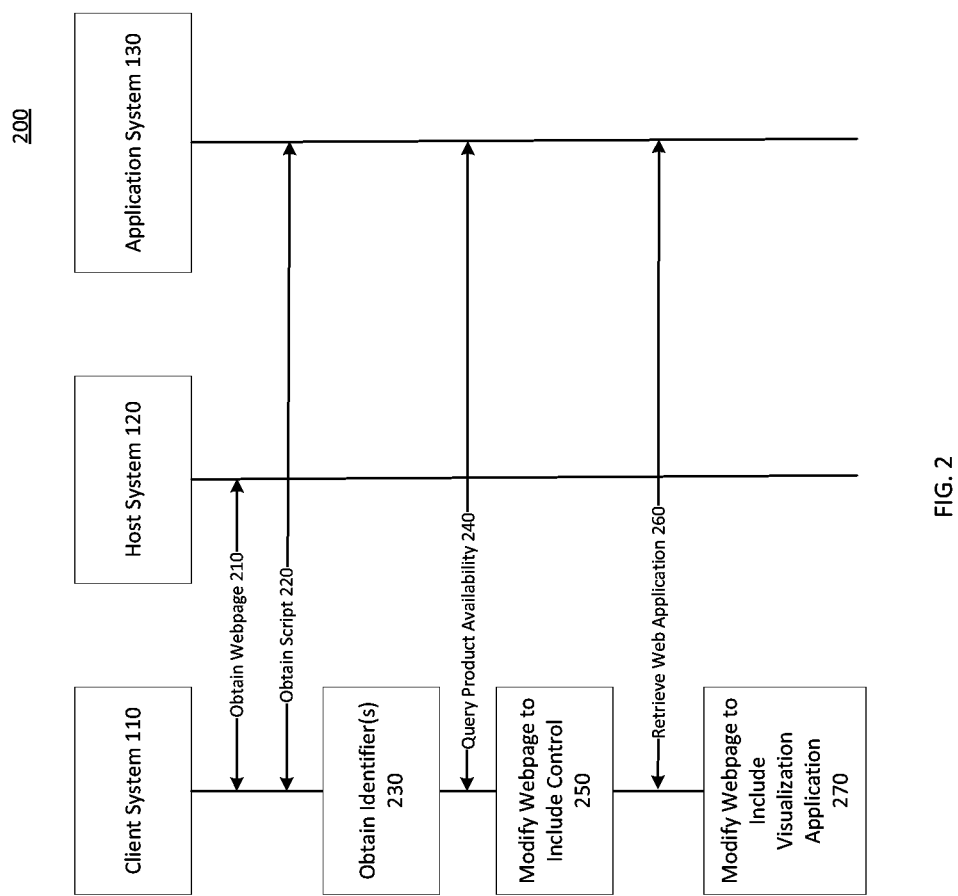
FIG. 2 depicts a method for initializing a visualization application, in accordance with disclosed embodiments.

FIG. 2 depicts a method 200 for initializing a visualization application, in accordance with disclosed embodiments. A webpage received from host system 120 and displayed by client system 110 can be modified using data and instructions received from application system 130 to display the visualization application. In this manner, the visualization application can be integrated into webpage provided by a host website, allowing the user to visualize products without having to leave or reload the website. In this manner, the visualization application can modify a webpage (which need not originally support single-page application functionality)

to provide single-page application functionality. Furthermore, method 200 can use a script to automate integration of the visualization application into the webpage. By using such a script, maintenance and development of the visualization functionality can be separated from maintenance and development of the webpage. In some embodiments, integration of the visualization functionality into the webpage may then require minimal modification of webpage (e.g., adding a script tag, as described herein).

In step 210, client system 110 can obtain a webpage from host system 120. Client system 110 can obtain the webpage through a network connection established with host system 120 according to network protocol (e.g., using an HTTP request, or the like). Host system 120 can provide the webpage in response to a request received from client system 110. The disclosed embodiments are not limited to a particular method of obtaining the webpage from host system 120.

The webpage can include code and instructions (e.g., Hypertext Markup Language or the like) for displaying content in a browser of client system 110. In some embodiments, the webpage can include product information for at least one product. For example, the webpage can be a product page providing detailed product information about a single product, or a catalog page including product information about each of multiple products. As a non-limiting example, the product information can include product name, product brand, product category, model numbers, serial numbers, stock keeping units (SKUs), product color options, pricing information, product dimensions, product availability and inventory information, product installation information, or similar information about the product The webpage can include vendor product code information usable to associate a product with visualization information for the product. In some embodiments, vendor product code information can be scrapable from the webpage. In various embodiments, the visualization information can be associated with an identifier for the product. The identifier may be unique for a combination of product and host system 120 (or product provider associated with host system 120), or unique for a combination of product, product type, and host system 120 (or product provider associated with host system 120).

Vendor product code information included in the webpage can be used to determine, create, or recover the identifier, enabling retrieval of the visualization information. For example, a stock keeping unit (SKU) number or Universal Product Code (UPC) for a product can serve as an identifier, associating the product with visualization information. The webpage can include the SKU number for the product. As an additional example, an identifier can be created (e.g., using one or more string operations) from two or more items of product information for a product (e.g., by concatenating the product name, product brand, and product color; or the like). The webpage can include the two or more items of product information for a product, enabling the identifier to be recreated by scraping the two or more items of product information from the webpage.

In step 220, client system 110 can obtain a script from application system 130. Client system 110 can obtain the script through a network connection established with application system 130 according to network protocol (e.g., using an HTTP request, or the like). The disclosed embodiments are not limited to a particular method of obtaining the webpage from application system 130.

In some embodiments, application system 130 can provide the script in response to a request received from client system 110. Client system 110 can generate the request while processing the webpage. For example, the webpage can include instructions (e.g., an HTML <script> tag) that, when parsed or executed by client system 110, cause client system 110 to request the script from application system 130. In some embodiments, in addition to the location of the script, the instructions can indicate a type, language, or version of the script (e.g., JavaScript or another suitable scripting language), or other information used in parsing or executing the script by client system 110. The disclosed embodiments are not limited to a particular scripting language or script format.

In some embodiments, the script can be specific to at least one of the webpage, host system 120, a product provider associated with host system 120, or a product type or category. In various embodiments, application system 130 can provide a previously generated script. In some embodiments, application system 130 can provide a script generated in response to the request. A script generated in response to the request can be specifically tailored to each request by client system 110.

Although depicted in FIG. 2 as two separate steps, in some embodiments, steps 210 and 220 can be performed as one step. For example, host system 120 can store a cached copy of the script, mirroring the script stored in the application system 130, and transmit the copy of the script to client system 110 with the webpage or after the website is transmitted.

In step 230, according to the script obtained in step 220, client system 110 can obtain identifiers for each of any products described or referenced in the webpage. In some embodiments, the script can configure client system 110 to scrape or parse the webpage for vendor product code information. For example, client system 110 can be configured to extract vendor product code information, as described herein, from a Document Object Model (DOM) of the webpage. In some embodiments, the vendor product code information can be stored in a predetermined location in the webpage (e.g., at a known location within a particular document element, within a hidden or displayed form element, within an element with a known name or id, or the like). In some embodiments, the vendor product code information can be extracted from the URL of the webpage. The script, which can be specific to the webpage, can cause client system 110 to extract the vendor product code information from the predetermined location in the webpage. In various embodiments, the script can extract the product information by searching the source code of the webpage for text with predetermined characteristics (e.g., product names, descriptions, colors, serial numbers, model numbers, or the like). In some embodiments, such searching can be performed using regular expressions or the like.

In some embodiments, client system 110 can be configured by the script to generate the identifier from the vendor product code information. For example, the identifier can be generated by applying one or more string operations to items of the vendor product code information (e.g., concatenating product name, brand, model number, and color to generate an identifier for the product).

In some embodiments, the product information can be included in the URL requesting the script as a parameter or part of the address. In these instances, the product information may have been transmitted to application system 130 prior to receipt of the script by client system 110. Application system 130 can then transmit a script that has been tailored to match the product.

In some embodiments, client system 110 can be configured by the script to manage user identity or session information. For example, in some embodiments, client system 110 can be configured by the script to place or check cookies identifying the user or establishing a session. To continue this example, when client system 110 lacks a current user session cookie, client system 110 can be configured by the script to generate such a cookie (e.g., by requesting a session or user identifier from application system 130 and storing the obtained information in the cookie). This cookie may be, or may be treated as, a first party cookie by client system 110. For example, the cookie can be associated with a domain of host system 120. Accordingly, this cookie may not be blocked by ad blockers or third-party cookie blockers. If a current user session cookie does exist in client system 110, but application system 130 does not recognize a corresponding session, client system 110 can be configured by the script to request application system 130 create a new user session associated with the user or with client system 110.

In step 240, according to the script obtained in step 220, client system 110 can query application system 130 for visualization information corresponding to the identifier(s) obtained in step 230. The query, and the response to the query, may not cause client system 110 to reload the webpage. For example, the query can be transmitted to application system 130 using Asynchronous JavaScript+ XML (AJAX) techniques, or the like, and the data transmitted with the query can be organized in the form of JavaScript Object Notation (JSON), or the like. As an additional example, the query can be as simple as a URL pointing to a predetermined location in application system 130. The visualization information may be present at that location.

In response to the query, application system 130 can determine whether visualization information corresponding to the identifier(s) is available. In some embodiments, application system 130 can compare the identifier(s) to a list or database of products having visualization information. Application system 130 can transmit to client system 110 an indication of whether visualization information corresponding to the identifier(s) is available.

In step 250, when visualization information is available for a product and according to the script obtained in step 220, client system 110 can modify the webpage to display a control. The control can be an interactive element in the webpage, for example, a button, a toggle, or the like. In some embodiments, the control may have been included in the webpage received from host system 120, but may be inactive (e.g., disabled, hidden, or the like). When the query indicates that visualization information is available for the product, client system 110 can modify the webpage to activate the control (e.g., permitting the control to be interacted with by a user). In some embodiments, the control may not have been included in the webpage received from host system 120. The control may then be added to the webpage. For example, client system 110 can be configured by the script to modify the webpage to include a selectable button at a location associated with the product. As the script may be specific to the webpage or to host system 120, the modification can preserve the look and feel of the webpage. Thus the control can be displayed in a manner that appears natural to the user and without disrupting the user experience.

In step 260, when visualization information is available for a product and according to the script obtained in step 220, client system 110 can retrieve a visualization application from application system 130. In some embodiments, client system 110 can retrieve a visualization application in response to selection of the control (e.g., by a user interaction) in the modified webpage. For example, selection of the control can trigger an event. The script can handle the event, causing client system 110 to retrieve the visualization application from application system 130. For example, when the webpage is modified to display a button control, a selection of the button by a user can cause client system 110 to retrieve the visualization application.

In step 270, when visualization information is available for a product and according to the script obtained in step 220, client system 110 can modify the webpage to display the visualization application. The visualization application can enable the user to select an image and modify the image to display the product, as described herein. In some embodiments, client system 110 can be configured by the script to modify the webpage to include a container, such as an iframe, or the like. Client system 110 can then load the retrieved visualization application into the container. The disclosed embodiments are not limited to use of a container. Other modifications resulting in display of the visualization application are also envisioned, including addition of a layer over the existing webpage, opening a new tab or a new window to display the visualization application, or removing or rearranging one or more webpage elements to create space for displaying the visualization application.

The operations of method 200 have been labeled and described sequentially, for convenient description. As would be appreciated by those of skill in the art, the indicated sequence is not intended to be limiting. Steps may be rearranged or combined, or additional steps may be added. For example, in some embodiments, a single operation can include querying product availability (step 240) and obtaining the script (step 220). For example, the webpage obtained in step 210 can contain an URL pointing to the location of the script and at least one parameter can be combined with the URL, in effect querying availability of visualization information for the product. Similarly, the visualization application can be retrieved prior to selection of the control in the modified webpage. The visualization application may not be integrated into the webpage or may be integrated into the webpage but set to "invisible" or "inactive," until the control is selected.

Figure 3:
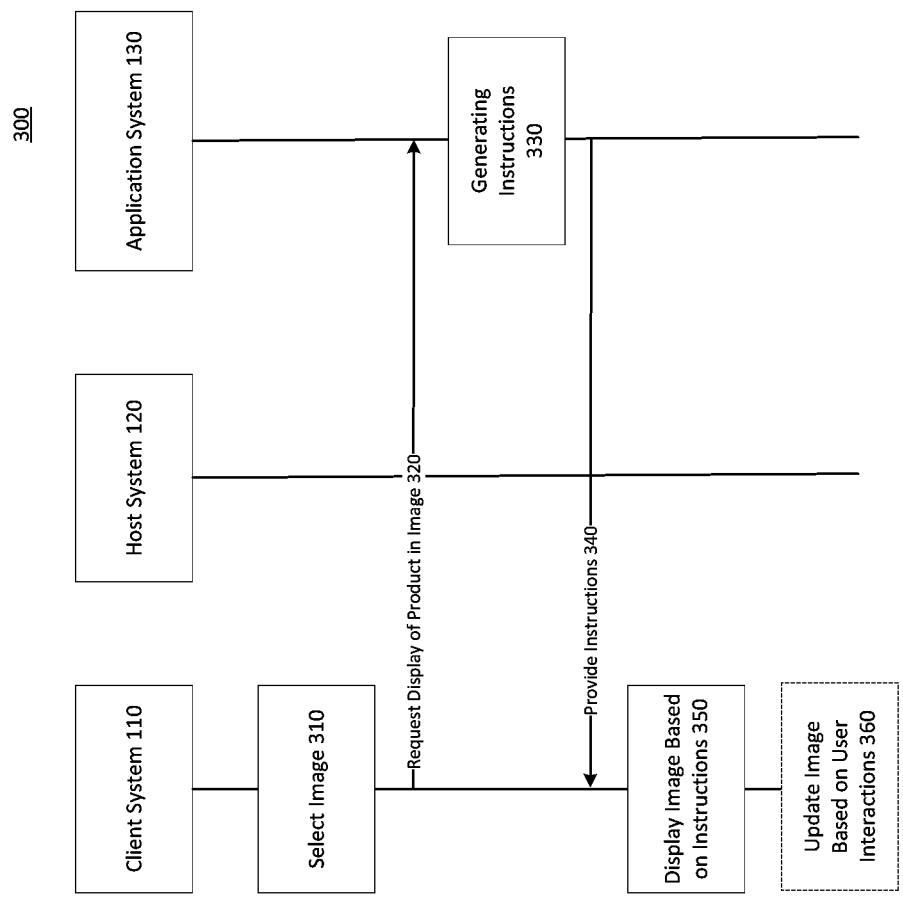
FIG. 3 depicts a method for interacting with a visualization application, in accordance with disclosed embodiments.

FIG. 3 depicts a method 300 for interacting with a visualization application, in accordance with disclosed embodiments. Such interactions can occur after modification of the webpage to display the visualization application. In some embodiments, a user can interact with the visualization application (e.g., through a graphical user interface of client system 110) to provide an image. The image can then be modified to include a product. The user may then further interact with the visualization application to modify the display of the product in the image (e.g., by modifying the object's placement, orientation, or the like).

In step 310, a user can interact with client system 110 to select an image. The image can be of location (indoor or outdoor) where the product can be placed. As a non-limiting example, the image can be of a room. The user can interact with a graphical user interface provided by the visualization application to select the image. In some embodiments, the graphical user interface may provide options for uploading an image. For example, the visualization application may provide the option to upload images from a memory accessible to client system 110. As a further example, the visualization application may provide the option to acquire an image and upload the acquired image (e.g., visualization application may provide an option to access a camera of client system 110 or communicatively connected to client system 110, to capture an image for uploading). To continue this example, when client system 110 is a smartphone, the visualization application can be used to obtain an image using the camera of the smartphone. In various embodiments, the graphical user interface of the visualization application may provide options for selecting an existing image (e.g., an image previously saved or uploaded by the user, or a default image). In some embodiments, client system 110 can be configured to communicate with application system 130 to obtain the image options for selection. For example, application system 130 can retrieve the image options and provide them to client system 110 for display. As an additional example, application system 130 can provide information enabling client system 110 to retrieve image options from another location. The image can be a JPG, GIF, Bitmap, PNG, or other suitable format. The disclosed embodiments are not limited to any particular standard or format of the image. An exemplary graphical user interface is described herein with regards to FIGS. 4A to 4L.

As described above, in some embodiments the user can cause client system 110 to display the visualization application by selecting a control associated with a product. The visualization application can be configured to display this product in the image. However, in some embodiments, the user can interact with the visualization application to select a product for placement in the image in addition to selecting the image. For example, the visualization application can display products available for visualization to the user and the user can interact with the visualization application to select a product. In such embodiments, the visualization application can display a thumbnail of each product and other information that may help the user to determine which product to select, (e.g. price, material, rate, etc.).

In step 320, client system 110 can provide a request to display the selected product in the selected image to application system 130. The request can be provided using network 140. The disclosed embodiments are not limited to any particular method or protocol for providing the request. In some embodiments, when the image is uploaded by client system 110, the request can include the image. In various embodiments, when an image option is selected, the request may include the image or an indication of the image. In some embodiments, client system 110 can convert the selected image into a predetermined format before transmitting it to application system 130, while in some other embodiments, client system 110 can transmit the selected image to application system 130 without converting the image. The disclosed embodiments are not limited to a particular format for transferring the image. In some embodiments, the request can indicate the selected product. In various embodiments, the request can include metadata concerning the image. For example, depth information can be associated with the image. In some embodiments, client system 110 can capture the depth information using one or more images from multiple cameras or multiple images from the same camera. The disclosed embodiments are not limited to a particular method of acquiring such depth information.

In step 330, application system 130 can generate instructions for modifying the selected image to display the selected product. In some embodiments, application system 130 can generate instructions enabling client system 110 to update the display of the product in the selected image in response to user input. In such embodiments, the instructions can include a product model and information enabling display of the product in the selected image. For example, when the product is a lamp, the instructions can include a three-dimensional model (3D) of the lamp and information specifying the perspective of the image and the distance from a viewpoint of the image to one or more surfaces depicted in the image. Such information could enable client system 110 to scale and rotate the 3D model of the lamp for correct placement on the one or more surfaces depicted in the image.

In various embodiments, the instructions received from application system 130 may not enable client system 110 to update the display of the product in the selected image in response to user input. Instead, client system 110 may request updates to the modified image from application system 130. In some embodiments, such instructions can include a version of the selected image modified to display the product in a particular position and orientation.

In some embodiments, generating the instructions can include creating a 3D model from the image. Application system 130 can be configured to generate the 3D model using a machine learning model, such as a convolutional neural network. The machine learning model can be configured to estimate depth and perspective information for the image. For example, the machine learning model can be configured to estimate a viewpoint for the image and a distance from the viewpoint to a depicted surface in the image or pixel in the image. In various embodiments, when the image depicts a room, the machine learning model can be configured to determine a shape of the room (e.g., the location of the walls, floor, or ceiling in the image, with respect to the viewpoint or to each other, or the like). In some embodiments, when the request received from client system 110 includes depth information, Application system 130 can be configured to use such depth information when creating the 3D model.

In some embodiments, application system 130 can be configured to perform semantic segmentation of the image. Such semantic segmentation can identify portions of the image relevant to placement of a product in the image. As a non-limiting example, semantic segmentation can be used to identify floors, walls, countertops, items of furniture (e.g., tables, bookcases, shelving), or the like in the image. In some embodiments, the semantic segmentation can be performed using, in addition to the image, the type of the product or the 3D model generated from the image. For example, when the product is a type of flooring, this product type can inform the semantic segmentation (e.g., through selection of a machine learning model for performing the segmentation or as an input to the machine learning model that performs the segmentation). Similarly, the 3D model can inform the semantic segmentation (e.g., the 3D model can indicate surfaces that may potentially be part of a floor).

Application system 130 can use one or more machine learning models to perform the semantic segmentation of the image. For example, Application system 130 can perform semantic segmentation using a convolutional neural network built on an AlexNet, VGG-16, GoogLeNet, ResNet, or other suitable architecture. The convolutional neural network can be trained to perform region-based semantic segmentation, fully convolutional network-based semantic segmentation, or to perform another suitable method of semantic segmentation.

In some embodiments, application system 130 can be configured to use multiple machine learning models to perform semantic segmentation of the image. The multiple machine learning models can be trained to identify differing portions of the image. For example, one machine learning model can be trained to identify floors in the image, while another machine learning model can be trained to identify walls in the image. Application system 130 can be configured to determine which of the multiple machine learning models to use based on a type of the product. For example, when the product is a wall clock, application system 130 can perform semantic segmentation on the image using a machine learning model trained to identify walls in the image. As an additional example, when the product is flooring, application system 130 can perform semantic segmentation on the image using a machine learning model trained to identify floors in the image.

The disclosed embodiments are not limited to embodiments using machine learning models trained to identify a single semantic class. For example, the disclosed embodiments can be configured to use a machine learning model trained to identify walls, floors, and counters in the image, or more generally identify surfaces in the image.

In some embodiments, application system 130 can be configured to store the image and the 3D model of the image. Should the user later want to place another product in the stored image, the stored image and model can be retrieved and reused.

Application system 130 can be configured to maintain a data storage subsystem (e.g. a database) storing product models. In response to a request from client system 110 indicating a selected product, application system 130 can be configured to retrieve a model for the selected product. The model of the selected product can include spatial information and surface detail information. The spatial information can specify the dimensions of the product. In some embodiments, such spatial information can include a mathematical representation of one or more surfaces of a product. In various embodiments, the spatial information can comprise a 2D or 3D model of the product. For example, a 3D model of a lamp can specify the location of points on the surface of the lamp in a three-dimensional space. As a further example, a 2D model of a poster can specify the height and width of the poster. Surface detail information can include textures, colors, patterns, or the like. For example, a product can be associated with a texture mapping, which can be applied to a 2D or 3D model of the product, or to a surface in the 3D model of the image. In various embodiments, some products may not be associated with a spatial model. For example, in some embodiments, products lacking predetermined dimensions, such as flooring, molding, paneling, wallpaper, countertops, or the like, may be associated with surface detail information but not spatial information.

Application system 130 can, in some embodiments, be configured to retrieve a product model for the selected product and include the product model in the instructions. Application system 130 can alternatively or additionally modify the selected image using the product model and then include the modified image in the instructions.

Application system 130 can modify the selected image by rendering the product model at a particular location in the selected image. Applicant system 130 can be configured to use a suitable rendering method, such as polygon-based rendering, scanline rendering, ray tracing, rasterization, or the like. Such rendering can include determining pixels in the selected image obscured by the rendered product model and replacing these pixels with corresponding pixels of the rendered product model. For example, application system 130 can determine that a wall clock may cover an area of the wall and replace the pixels in the selected image with corresponding pixels in a rendering of the wall clock. In various embodiments, the particular location can be determined based on information included in the request. For example, the user can specify a location for a product (e.g., a lamp) in the image (e.g., on a table depicted in the image).

In some embodiments, the particular location can be determined by application system 130. For example, application system 130 can determine suitable locations in the image based on semantic segmentation, as described herein, and a type of the product. In this example, application system 130 may determine that the product is a lamp and that the image includes a surface suitable for placement of a lamp (e.g., a tabletop, countertop, shelf, or the like). Application system 130 may then render the lamp on the suitable surface.

Application system 130 can modify the selected image by painting an image of the product on suitable portions of the selected image, using surface detail information for the product and a 3D model of the image. As described above, application system 130 can perform semantic segmentation on the image to associate classes with pixels in the image. In some instances, when a type of the product matches one of the classes, an image of the product generated using the surface detail information can be painted over pixels associated with that class. For example, when the product is a type of flooring, application system 130 can replace portions of the selected image associated with the class "floor" with corresponding texture-mapped portions of the flooring.

In step 340, application system 130 provides the instructions generated in step 330 to client system 110. The instructions can be provided using network 140. The disclosed embodiments are not limited to any particular method or protocol for providing the instructions. In some embodiments, the instructions may include a modified image displaying the selected product. In various embodiments, the instructions may include the selected image (e.g., when the request in step 320 indicated an image option but did not include an uploaded image) and a rendered version of a product model (e.g., a rendered version of the product model, appropriately scaled and oriented such that it can be combined with the image, together with information enabling the client system to combine the images). In some embodiments, the instructions can include a product model for the selected product, together with instructions for rendering the product model and displaying the rendered product model in the selected image. For example, the instructions can include a 3D model of the selected image and results of semantic segmentation of the selected image (e.g. associations between pixels in the selected image).

In step 350, client system 110 can be configured to display the selected image, modified to include the selected product, using the received instructions. When the instructions include a modified image displaying the selected product, client system 110 can be configured to display the modified image. When the instructions include a rendered product model and the selected image, client system 110 can be configured to combine the rendered product model and the selected image to generate the modified image. Client system 110 can then display the modified image. When the instructions include the product model and instructions for rendering the product model and displaying the rendered product model in the selected image, client system 110 can perform such rendering and display the resulting modified image. For example, the instructions include a 3D spatial model of the product, surface detail information for the product, and a 3D model of the image. The 3D model of the image can include perspective information and depth information for surfaces in the image. Client system 110 can be configured to use the perspective and 3D model of the image to render the product in the image at locations indicated by the user.

Optionally, in step 360, the client system 110 can be configured to update the modified image based on user interactions with the visualization application. Preferably, the user can interact with the modified image to adjust the location and orientation of the displayed product in the image. For example, the user can rotate the product and move the product to place the product at a different location. Preferably, client system 110 can limit the range within which the product can be placed depending on the type of the product and the classification of pixels in the selected image. For example, the user can move a carpet within the range of pixels identified as representing floors. In some embodiments, client system 110 can re-render the product image or/and re-combine the product image with the selected image as described above. In some embodiments, client system 110 can transmit the user interaction to application system 130 and request display of the product in the room image with updated instructions. In these cases, the system can repeat steps 330 to 350.

Figure 4A:
FIG. 4A-L depicts exemplary view of interactions with a visualization application, in accordance with disclosed embodiments.

FIG. 4A-L depicts an exemplary client system 110 implementing an embodiment of the current invention. FIG. 4A illustrates the interface of client system 110 when visiting host system 120. For the purpose of the illustration, host system 120 is a website for a home supplies store. Client system 110, as described above, can be any computing device with a display. For the purpose of illustration, client system 110 in this example is a smartphone with a camera. Client system 110 requests a webpage from the host system 120 (e.g. a website of the home supplies store) and displays the webpage to the user. The webpage can list a group of categories of products (e.g. floors, wallpapers, furniture, etc.). Each of the listed categories is associated with a button labeled with the name of the category, which, if clicked, causes client system 110 to request the webpage depicted in FIG. 4B.

Figure 4B:
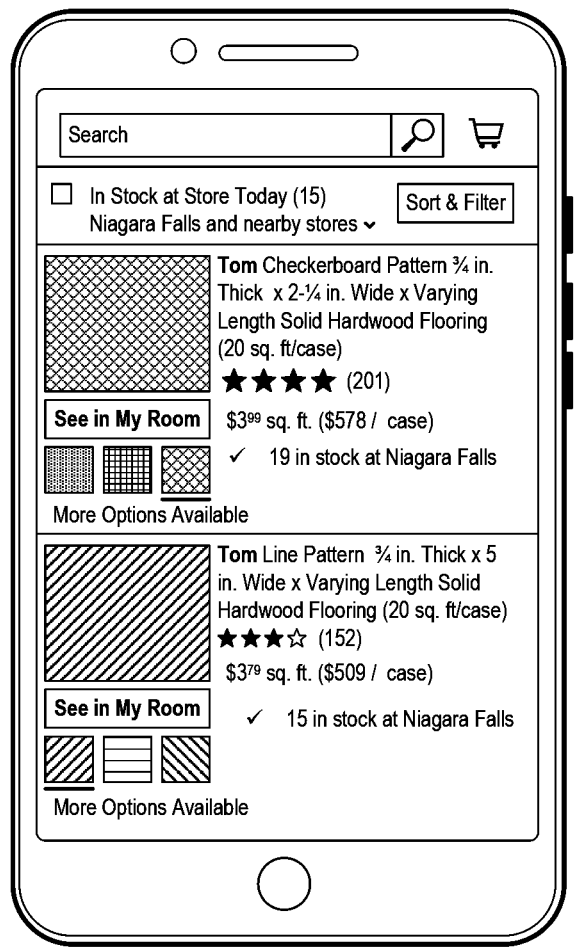
Figure 4C:
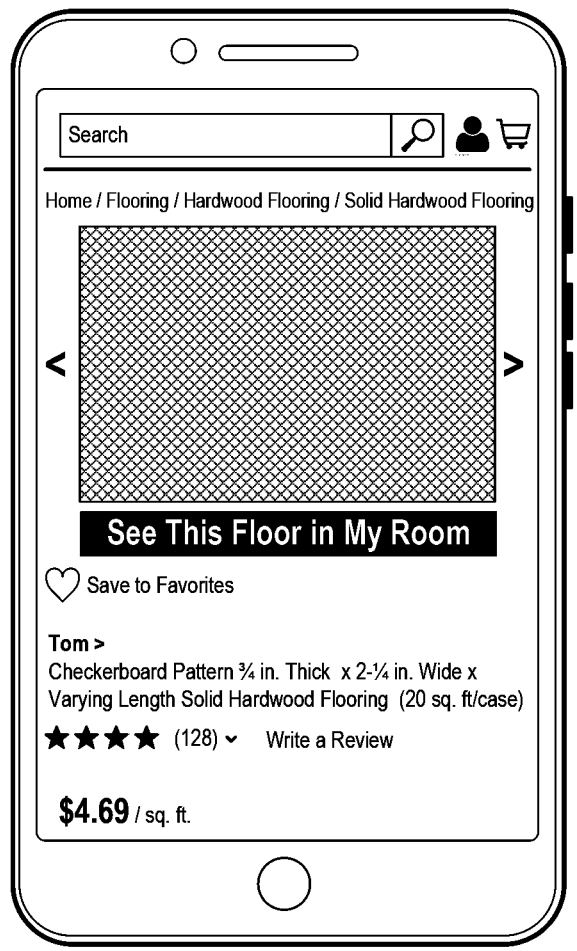

FIG. 4B depicts an exemplary webpage retrieved from host system 120. This webpage shows a list of products. Similar to FIG. 4B, FIG. 4C depicts an exemplary webpage retrieved from host system 120. Unlike FIG. 4B, FIG. 4C depicts product information for a single product. During loading of the webpages depicted in FIGS. 4B and 4C, client system 110 requested a script from application system 130. As described above with regards to FIG. 2, the script has executed, causing client system 110 to identify the products listed in each of the webpages. Client system 110 has communicated with application system 130 to determine that visualization information for the products is available. Accordingly, each webpage has been modified to include "See in My Room" buttons beneath each product. For each webpage, the user can click the button to start the visualization application.

Figure 4D:
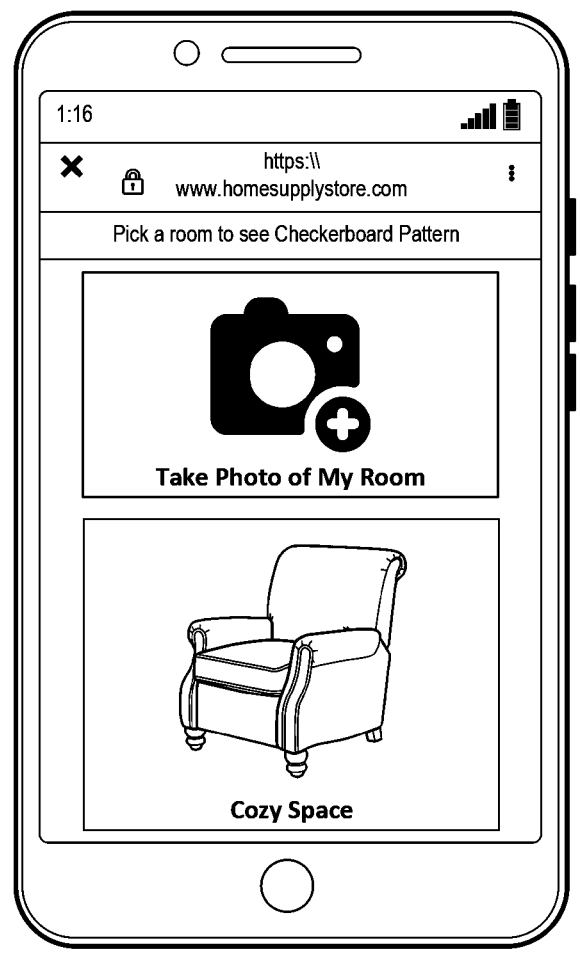
Figure 4E:
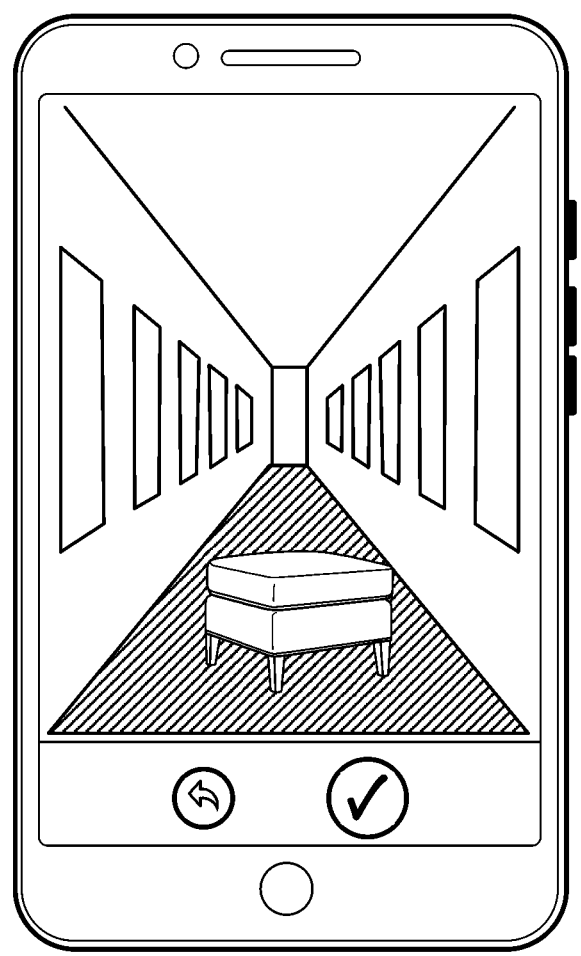

FIGS. 4D and 4E depict interactions with a visualization application following selection of a "See in My Room" button beneath a product. In FIG. 4D, the webpage has been modified to include the visualization application. The visualization application is providing an interface for selecting either a predetermined image (e.g. "cozy space") or choosing to upload an image (e.g., "Take Photo of My Room"). When the user selects uploading an image, client system 110 can operate the camera of client system 110 to enable the user to take a photo of the room. In some embodiments, although not depicted in the FIGS. 4D and 4E, the user can select an image previously stored by application system 130 or an image previously obtained by client system 110. After the photo is selected or confirmed, client system 110 can transmit the photo or an indication of a selected photo to application system 130, which, in return, generates instructions and transmits them to client system 110 as described above with regards to FIG. 3.

Figure 4F:
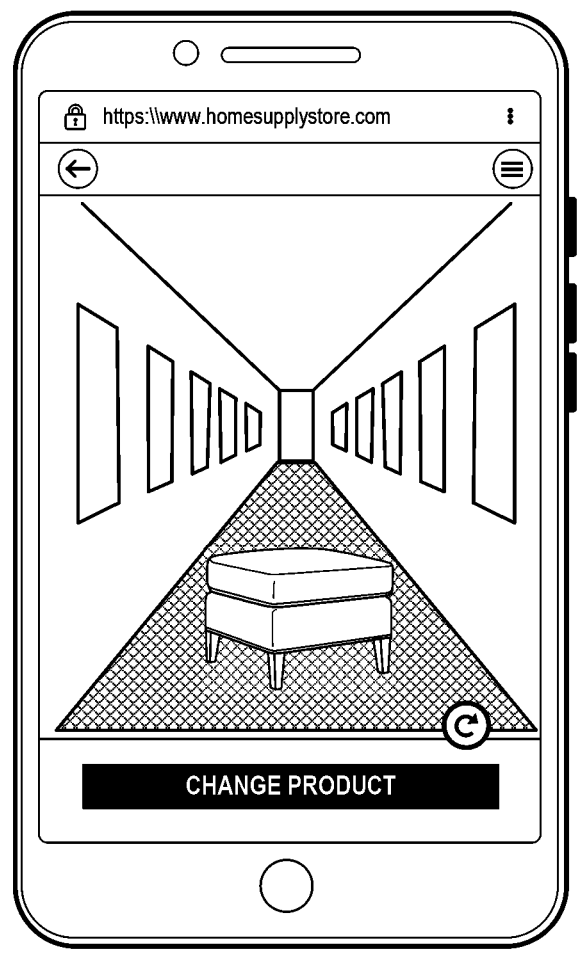

FIG. 4F depicts display, by the visualization application, of a modified image displaying a product. In this non-limiting example, the floor in the selected image (depicted in FIG. 4E) has been replaced with an image of a flooring product (the hardwood floor depicted in FIG. 4C). As described herein, the "floor" pixels in the selected image have been identified through semantic segmentation. The surface detail information (e.g., the pattern, color, and texture of the flooring product) of the product have been texture mapped to the identified pixels.

Figure 4G:
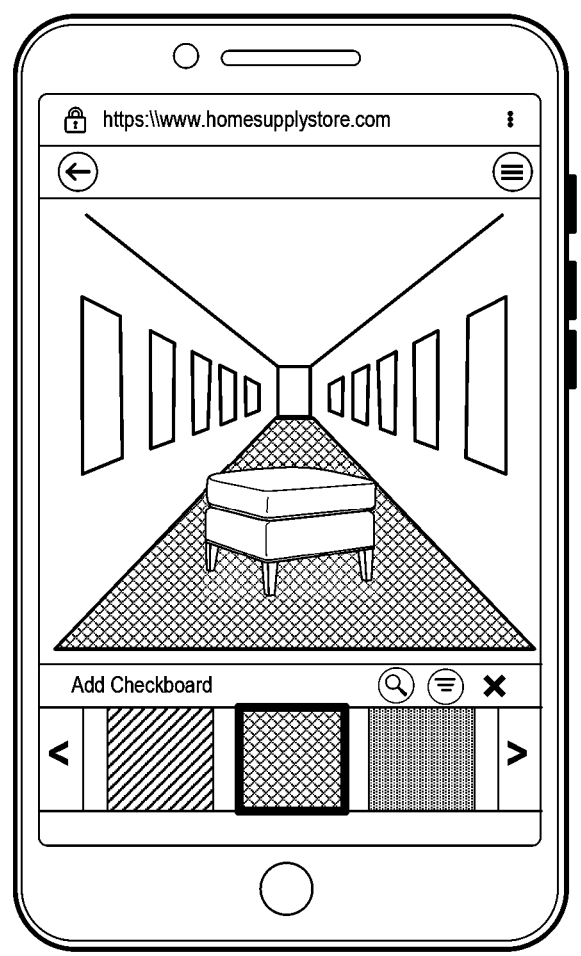
Figure 4H:
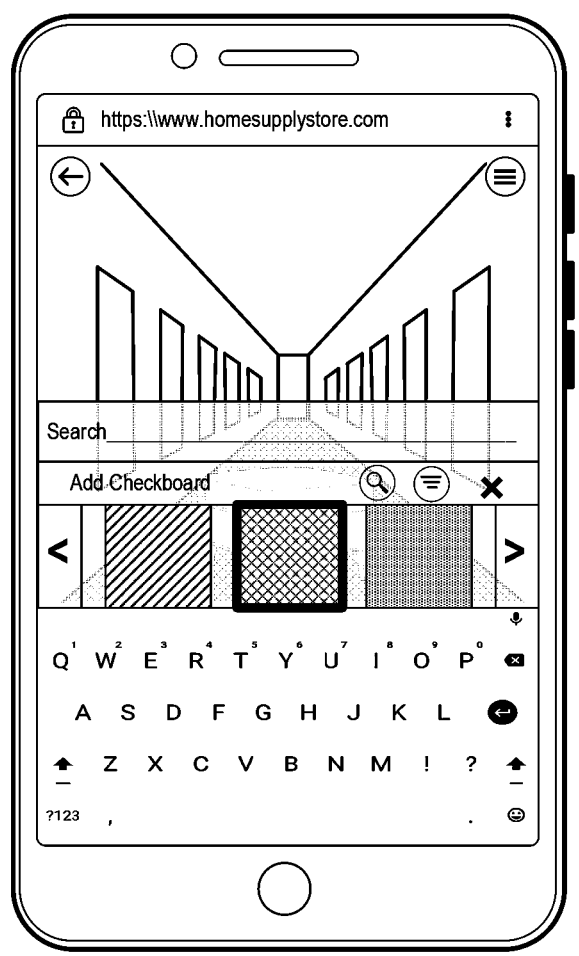
Figure 4I:
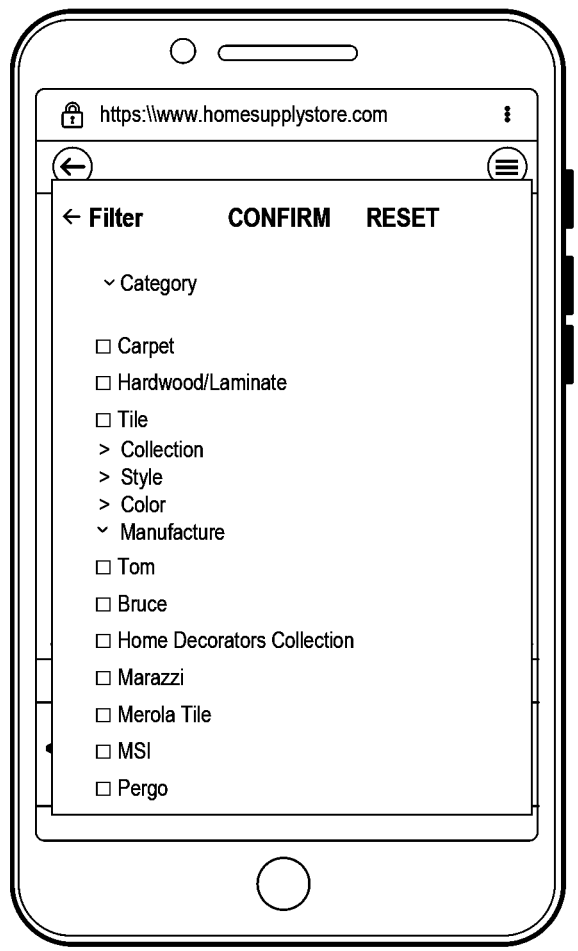

FIG. 4G-4I depicts an interface for updating the modified image. In FIG. 4G, a list of thumbnails of suggested products is displayed in the user interface. In some embodiments, client system 110 can be configured to store a list of such products. Alternatively, client system 110 can query application system 130 to populate the list of products. Although FIG. 4G depicts the thumbnails at the bottom of the display, the thumbnails can be placed at any portion of the display. As depicted in FIG. 4H, the user can search for a product by entering text into client system 110. As depicted in FIG. 4I, the user can apply one or more filters to limit the number of products being displayed. In some embodiments, client system 110 can search or filter the product locally. In some embodiments, client system 110 can transmit the search request or the filtering request to application system 130 and receive from application system 130 an updated product list. Following selection of a new product, the modified image can be updated to display the new product. Such updating can include providing, by client system 110 to application system 130, a request to display the new product in the selected image. Client system 110 can receive instructions for displaying the new product in the selected image in response.

Figure 4J:
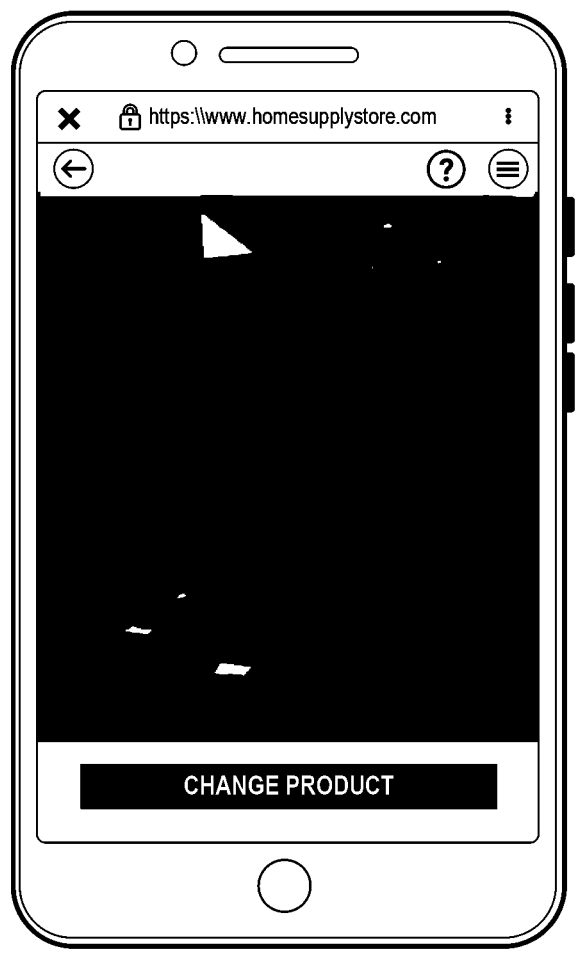
Figure 4K:
Figure 4L:
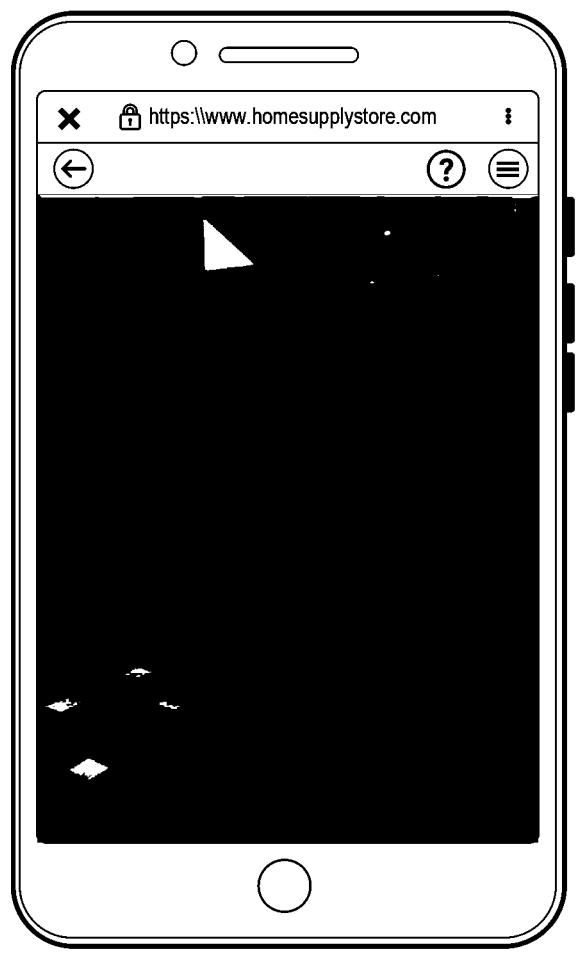

FIGS. 4J-4L depicts interactive modification to the display of a product in an image. In this non-limiting example, the product is a rug. In FIG. 4J, the rug is displayed in a first position on the floor of the room. The view of the rug is adjusted to match the perspective and viewpoint of the image. Furthermore, the existing ottoman is displayed as being on top of the rug. In FIG. 4K, the visualization application provides instructions on changing the position and orientation of the rug in the image using a set of pre-defined touch screen gestures (e.g., press and drag to move the object around the room and press and turn with two fingers to rotate the object). In some embodiments, the user can interact with the object using a mouse, a keyboard, or any other available input device. As depicted in FIG. 4L, in response with the user interaction, the displayed position and orientation of the object can be updated. As described above with regards to FIG. 3, such updating can be performed locally by client system 110, using a 3D model of the image and a product model, performed remotely at application system 130, or performed in part locally and in part remotely. For example, client system 110 can transmit the user interactions to application system 130, which can modify the images and transmit the modified image back to client system 110. Alternatively, client system 110 can transmit the product selection to application system 130 and receive a product model and instructions for positioning the product in the selected image. Client system 110 can then render the product model, combine the rendered product model with the selected image, and display the resulting modified image to the user without communicating with the Application System 130.

Figure 5:
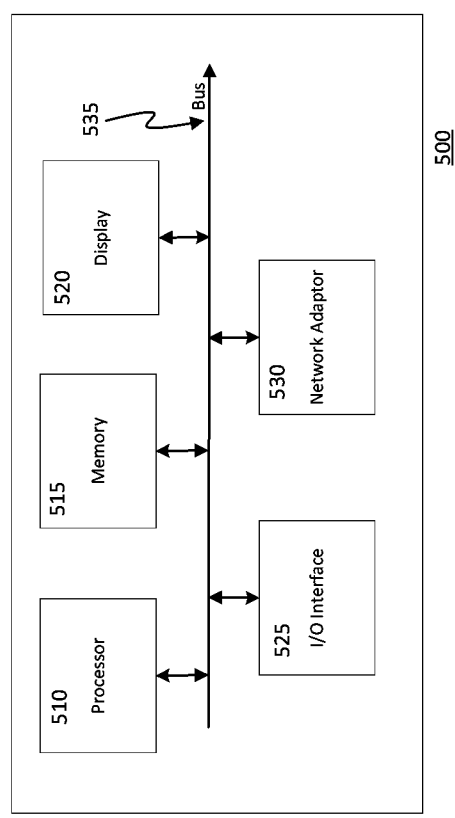
FIG. 5 depicts a schematic of exemplary computing system for performing the envisioned systems and methods, consistent with disclosed embodiments.

FIG. 5 depicts a schematic of exemplary computing system 500 for performing the envisioned systems and methods, consistent with disclosed embodiments. In some embodiments, computing system 500 can include a processor 510, memory 515, display 520, I/O interface(s) 525, and network adapter 530. These units may communicate with each other via bus 535, or wirelessly. The components shown in FIG. 5 may reside in a single device or multiple devices.

Consistent with disclosed embodiments, processor 510 may comprise a central processing unit (CPU), graphical processing unit (GPU), or similar microprocessor having one or more processing cores. Computing system 500 may include one or more processors 510 and may further operate with one or more other processors that are remote with respect to processors 510. Memory 515 may include non-transitory memory containing non-transitory instructions, such as a computer hard disk, random access memory (RAM), removable storage, or remote computer storage. In some aspects, memory 515 may be configured to store data and instructions, such as software programs. For example, memory 515 may be configured to store data and instructions. In some aspects, processor 510 may be configured to execute non-transitory instructions and/or programs stored on memory 515 to configure computing system 500 to perform operations of the disclosed systems and methods. In various aspects, as would be recognized by one of skill in the art, processor 510 may be configured to execute non-transitory instructions and/or programs stored on a remote memory to perform operations of the disclosed systems and methods.

Display 520 may be any device which provides a visual output, for example, a computer monitor, an LCD screen, etc. I/O interfaces 525 may include hardware and/or a combination of hardware and software for communicating information to computing system 500 from a user of computing system 500, such as a keyboard, mouse, trackball, audio input device, touch screen, infrared input interface, or similar device. Network adapter 530 may include hardware and/or a combination of hardware and software for enabling computing system 500 to exchange information using external networks, such as network 140. For example, network adapter 530 may include a wireless wide area network (WWAN) adapter, a Bluetooth module, a near field communication module, or a local area network (LAN) adapter.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware, but systems and methods consistent with the present disclosure can be implemented with hardware and software. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A system for visualizing products in a single-page application, comprising:
   at least one processor; and
   at least one memory containing first instructions that, when executed by the at least one processor, cause the system to perform first operations comprising:
      receiving, from a client system and during rendering of a webpage received by the client system in response to a first request, a second request for a script, the script associated with a host system and executable by the client system to perform second operations comprising:
         modifying the webpage to include a visualization control;
         displaying a visualization application in response to a selection of the visualization control in the webpage by a user of the client system;
         transmitting, to an application system, a third request to display a product in a first image;
         receiving, from the application system, a second instructions to display the product at an identified location in the first image; and
         displaying, by the visualization application, the product in accordance with the second instructions; and
      providing the script to the client system.

2. The system of claim 1, wherein the first operations comprise receiving the first and second requests by the host system.

3. The system of claim 1, wherein the first operations comprise providing the script by the application system.

4. The system of claim 1, wherein the second operations further comprise generating an identifier of the product based on information stored in the webpage at a predetermined location.

5. The system of claim 1, wherein the second operations further comprise displaying the visualization application in the webpage.

6. The system of claim 1, wherein the second operations further comprise displaying the visualization application in a new tab or a new webpage.

7. The system of claim 1, wherein the second request and the third request are transmitted in a single request.

8. The system of claim 1, wherein:
the webpage depicts multiple products;
the second operations comprise receiving, through user interactions with the webpage, a selection of one of the multiple products as the product; and
the third request is transmitted in response to the selection of the product.

9. The system of claim 1, wherein the second instructions comprise a third image generated by adding an image of the product to the first image at the identified location.

10. The system of claim 1, wherein the second instructions include a three-dimensional model of the product and metadata specifying the scaling and placement of the three-dimensional model in the first image.

11. A method for visualizing products in a single-page application, comprising:
receiving, from a client system and during rendering of a webpage received by the client system in response to a first request, a second request for a script, the script associated with a host system and executable by the client system to perform second operations comprising:
modifying the webpage to include a visualization control;
displaying a visualization application in response to a selection of the visualization control in the webpage by a user of the client system;
transmitting, to an application system, a third request to display a product in a first image;
receiving, from the application system, a second instructions to display the product at an identified location in the first image; and
displaying, by the visualization application, the product in accordance with the second instructions; and
providing the script to the client system.

12. The method of claim 11, wherein the method further comprises receiving the first and second requests by the host system.

13. The method of claim 11, wherein the method further comprises providing the script by the application system.

14. The method of claim 11, wherein the second operations further comprise generating an identifier of the product based on information stored in the webpage at a predetermined location.

15. The method of claim 11, wherein the second operations further comprise displaying the visualization application in the webpage.

16. The method of claim 11, wherein the second operations further comprise displaying the visualization application in a new tab or a new webpage.

17. The method of claim 11, wherein the second request and the third request are transmitted in a single request.

18. The method of claim 11, wherein:
the webpage depicts multiple products;
the second operations comprise receiving, through user interactions with the webpage, a selection of one of the multiple products as the product; and
the third request is transmitted in response to the selection of the product.

19. The method of claim 11, wherein the second instructions comprise a third image generated by adding an image of the product to the first image at the identified location.

20. The method of claim 11, wherein the second instructions include a three-dimensional model of the product and metadata specifying the scaling and placement of the three-dimensional model in the first image.

* * * * *

UNITED STATES PATENT AND TRADEMARK OFFICE
CERTIFICATE OF CORRECTION

| | | |
|---|---|---|
| PATENT NO. | : 11,200,365 B2 | Page 1 of 1 |
| APPLICATION NO. | : 16/947817 | |
| DATED | : December 14, 2021 | |
| INVENTOR(S) | : Stefan-Alexandru Ghiaus et al. | |

It is certified that error appears in the above-identified patent and that said Letters Patent is hereby corrected as shown below:

In the Claims

In Claim 1, Column 18, Lines 52-53, "from the application system, a second instructions" should read --from the application system, second instructions--.

In Claim 11, Column 20, Lines 1-2, "from the application system, a second instructions" should read --from the application system, second instructions--.

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*